(12) United States Patent
Fiorenza De Lima et al.

(10) Patent No.: US 11,846,380 B2
(45) Date of Patent: Dec. 19, 2023

(54) DEVICE AND METHOD FOR REPAIRING A HOSE OF UMBILICALS

(71) Applicant: PETROLEO BRASILEIRO S.A. - PETROBRAS, Rio de Janeiro (BR)

(72) Inventors: Henri Fiorenza De Lima, Vila Velha (BR); Gustavo Geraldo Pappen, Vitoria (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 380 days.

(21) Appl. No.: 17/258,515

(22) PCT Filed: Jul. 4, 2019

(86) PCT No.: PCT/BR2019/050251
§ 371 (c)(1),
(2) Date: Apr. 19, 2021

(87) PCT Pub. No.: WO2020/010418
PCT Pub. Date: Jan. 16, 2020

(65) Prior Publication Data
US 2021/0239252 A1 Aug. 5, 2021

(30) Foreign Application Priority Data
Jul. 9, 2018 (BR) .......................... 1020180139657

(51) Int. Cl.
*F16L 55/18* (2006.01)
*F16L 55/165* (2006.01)
*F16L 55/10* (2006.01)

(52) U.S. Cl.
CPC ............. *F16L 55/165* (2013.01); *F16L 55/10* (2013.01)

(58) Field of Classification Search
CPC ............................... F16L 55/165; F16L 55/10
(Continued)

(56) References Cited

U.S. PATENT DOCUMENTS 3,204,274 A * 9/1965 Knapp .................. B08B 9/0553
15/104.061
3,688,801 A * 9/1972 Rohrer ................ F16L 55/1657
138/97

(Continued)

*Primary Examiner* — James F Hook
(74) *Attorney, Agent, or Firm* — RAPHAEL BELLUM PLLC

(57) ABSTRACT

The present invention relates to devices for repairing hoses of umbilicals. In this context, the present invention provides a device for repairing a hose (3) of an umbilical, comprising a tubular repair body (1) and a fusible element (2) adapted to obstruct the passage of fluid through the inside of the repair body (1), wherein the repair body (1) comprises an outside diameter that matches the internal diameter of the hose (3) to be repaired. In addition, the invention further provides a method for repairing a hose (3) of an umbilical comprising the steps of: blocking a first end (31) of a hose (3) of an umbilical; inserting a device for repairing a hose (3) of an umbilical into a second end (32) of the hose (3); injecting a polymer sealant into the second end (32) of the hose (3); using upstream pressure to move the repair device as far as the region of the leak, until the repair body (1) completely covers the opening/leak site (4); flushing the polymer sealant between the internal wall of the hose (3) and the external wall of the device as far as the opening/leak site (4) in the house (3); solidifying the polymer sealant, thereby attaching the tubular repair body (1) inside the hose (3); releasing the first end (31) of the hose (3) of the umbilical; and flushing the fusible element (2) through the inside of the hose (3).

6 Claims, 1 Drawing Sheet

(58) Field of Classification Search
USPC .............................................. 138/97, 98, 89
See application file for complete search history.

(56) References Cited

U.S. PATENT DOCUMENTS

| | | | | |
|---|---|---|---|---|
| 3,710,812 | A * | 1/1973 | Wise | F16L 55/179 |
| | | | | 138/97 |
| 3,845,789 | A * | 11/1974 | Rohrer | F16L 55/1657 |
| | | | | 138/97 |
| 3,907,049 | A * | 9/1975 | Baffas | B29C 63/26 |
| | | | | 285/55 |
| 4,009,732 | A * | 3/1977 | Martin | F16L 55/0337 |
| | | | | 138/97 |
| 4,077,435 | A * | 3/1978 | Van Scoy | F16L 55/1283 |
| | | | | 138/93 |
| 4,090,534 | A * | 5/1978 | Martin | F16L 55/18 |
| | | | | 251/212 |
| 4,804,018 | A * | 2/1989 | Carr | F16L 55/10 |
| | | | | 138/93 |
| 5,066,208 | A * | 11/1991 | Warmerdam | G01M 3/2853 |
| | | | | 264/269 |
| 5,186,214 | A * | 2/1993 | Savard | F16L 55/1116 |
| | | | | 228/119 |
| 5,533,224 | A * | 7/1996 | Knapp | B08B 9/0553 |
| | | | | 15/104.061 |
| 6,761,187 | B1 * | 7/2004 | Zoellner | B29C 66/112 |
| | | | | 285/21.2 |
| 7,296,597 | B1 | 11/2007 | Freyer | |
| 2005/0279417 | A1 | 12/2005 | Bednarzik | |
| 2011/0056579 | A1 | 3/2011 | Tsai | |
| 2013/0192696 | A1 | 8/2013 | Bowie | |
| 2015/0034198 | A1 | 2/2015 | Cheatham | |

\* cited by examiner

DEVICE AND METHOD FOR REPAIRING A HOSE OF UMBILICALS

FIELD OF THE INVENTION

The present invention is related to duct and riser technologies, subsea equipment technologies, and technologies for inspecting materials, equipment and corrosion. More specifically, the present invention is related to devices for repairing umbilical hoses.

BACKGROUND OF THE INVENTION

A recurring problem in the offshore oil industry is leaks in undersea valve-activated thermoplastic hydraulic hoses present in electro-hydraulic umbilicals, caused by inadequate installation procedures that may lead to the collapse of these hoses, making them more fragile locally.

This can lead to the occurrence of leaks, which may be small, impacting hydraulic fluid losses, or large leaks that do not even allow maintenance, which in most cases results in production losses.

In the event of failure of an umbilical hose, there are usually reserve hoses, and activation of subsea valves may be altered in the subsea equipment itself (ANM, manifold, or others).

Depending on the reason for failure of a hose, the probability of there being a failure in another hose may be high, and could also affect the reserve hoses.

For small leaks, it is possible to use polymer sealants that solidify when submitted to a certain pressure variation. This technique is currently widely used in the industry, and is sufficiently efficient for handling small leaks in hoses of electro-hydraulic umbilicals.

Using this method, after a leak in an electro-hydraulic umbilical hose has been identified, the hose is disconnected on one end, through which the polymer sealant (fluid) passes so it can be inserted. The polymer sealant thus flows through the hose of the electro-hydraulic umbilical at a substantially constant pressure until the area of the leak is reached.

At the moment at which the polymer sealant reaches the point where the leak is located, at least one part of the sealant passes through the hole (leak), so that the difference in pressure to which the sealant is submitted, from inside the hose (high pressure) to outside the hose (low pressure), causes the sealant to solidify exactly and only at the hole in the hose.

It is important to note that if the leak is small and slow, the sealant has sufficient time to solidify before exiting completely outside of the hose through the hole.

However, these polymer sealants cannot be used efficiently for large leaks. With large leaks the speed of the leak is so high that the sealant does not have time to solidify in time to block the passage of more sealant present in the hose.

Thus, this technique is not very useful for repairing large leaks in hoses of electro-hydraulic umbilicals.

Some documents in the state of the art are focused on solutions to what is described above, which will be presented below.

Document U.S. Pat. No. 7,717,137B2 reveals an expandable device to isolate and repair leaks in ducts that have a reusable elastomeric reservoir, elastic pipes and internal door-opening elements, a mechanism for forming a seal and a restricting mechanism to restrict the expansion of the casing. According to this document, the system basically comprises a tubular body with a narrower central section, wherein the device is inserted into the duct such that the central section is positioned in the area to be repaired. Then the central section is expanded and a sealant is injected into the contact with the duct, sealing the area that has the leak.

However, the insight from this document also cannot be used to repair large lengthwise leaks, because in order to do this the tubular body must be very long, rendering its use unviable.

Document U.S. Pat. No. 7,513,275B2 reveals a repair kit for a natural gas piping system that has a wrapping element that wraps a leak sealant and a pressure block, and that comes into contact with a pressure sealant and a portion of the natural gas piping adjacent to the leak.

However, the method in this document involves the application of a sealant to the external portion of the pipe, which is absolutely unfeasible in many situations.

Document U.S. Pat. No. 7,954,517B1 reveals a method for repairing piping that usually involves: the attachment of a blind rivet to an orifice; mechanical deformation of the body of the rivet using a mandrel; and removal of the mandrel from the rivet, thus forming a watertight seal between the blind rivet and the orifice on the pipe.

This method may only be used on rigid ducts, which makes its use unviable in many situations.

Document U.S. Pat. No. 9,261,218B2 reveals a method for sealing leaks on a pipe used to transport fluid that involves generating internal pressure to inflate a sealing device to cover the opening of the leak.

Document U.S. Pat. No. 7,296,597B1 reveals a method for performing maintenance operations on pipes that involves the positioning and subsequent expansion of an inflatable component to form a seal inside the pipe.

However, the latter two methods cannot be used on many ducts, especially ducts with smaller diameters.

As will be better detailed below, the present invention seeks to resolve the problems in the state of the art described above in a practical and efficient manner.

SUMMARY OF THE INVENTION

The purpose of the present invention is to provide a device for repairing the hose of an electro-hydraulic umbilical that is efficient in repairing large leaks in these hoses.

In order to attain the objectives described above, the present invention provides a device for repairing the hose of an umbilical comprising a tubular repair body, and a fusible element adapted to block the passage of fluid through the inside of the repair body, wherein the repair body comprises an external diameter that matches the internal diameter of the hose to be repaired.

The present invention also provides a method for repairing a hose of an umbilical comprising the steps of: blocking a first end of a hose of an umbilical; inserting a device to repair the hose of the umbilical on a second end of the hose; injecting a polymer sealant into the second end of the hose; using pressure to move the repair device upstream to the area of the leak until the repair body completely covers the opening; flushing the polymer sealant between the internal wall of the hose and the external wall of the device until the opening in the hole is reached; solidifying the polymer sealant attaching the tubular repair body inside the hose; releasing the first end of the umbilical hose; and flushing the fusible element inside the hose.

BRIEF DESCRIPTION OF THE FIGURES

The detailed description presented below references the attached figures and their respective reference numbers.

DETAILED DESCRIPTION OF THE INVENTION

First, it is noted that the following description will begin with a preferred embodiment of the invention. As will be evident to anyone versed in the matter, however, the invention is not limited to that specific embodiment.

Figure 1:
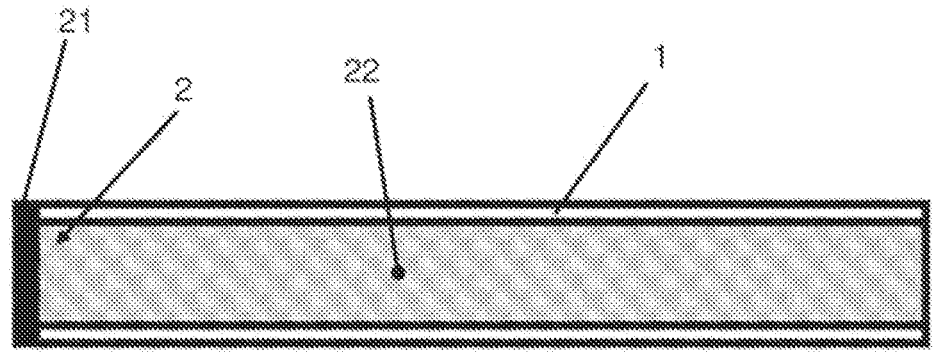
FIG. 1 shows a schematic view of the device used to repair umbilical hoses in accordance with a preferred configuration of the present invention.
Figure 2A:
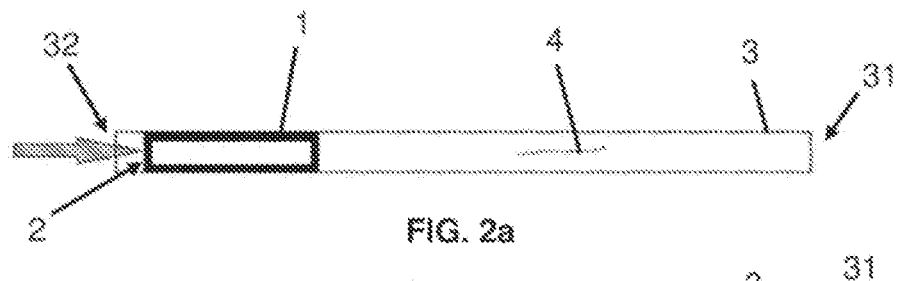
FIGS. 2a to 2d schematically illustrate how the device for repairing umbilical hoses in FIG. 1 is applied to repair a leak in a hose.
Figure 2B:
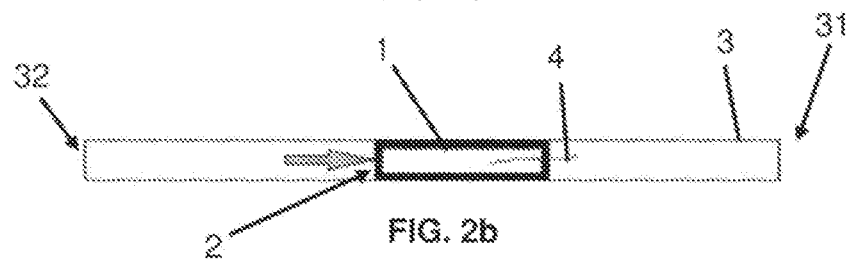
Figure 2C:
Figure 2D:
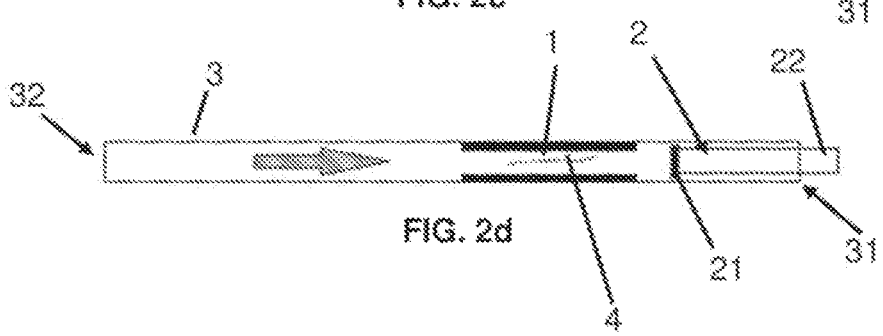

FIG. 1 shows a view of the device to repair an umbilical hose 3 in accordance with a preferred configuration of the present invention.

More broadly, the device comprises a tubular repair body 1, and a fusible element 2 adapted to obstruct the passage of fluid through the inside of the repair body 1. The repair body 1 must comprise an external diameter that matches the internal diameter of the hose 3 to be repaired.

In an optional configuration, the fusible element 2 comprises a cylindrical body 22 that is internal to the repair body 1 and a fusible plug 21 whose diameter is larger than the diameter of the cylindrical body 22.

FIGS. 2a to 2d schematically illustrate how the device for repairing umbilical hoses 3 in FIG. 1 is used to repair a leak in a hose 3.

Use of the device of the present invention is as follows.

First, a first end 31 of the hose 3 is blocked (if necessary) so that no fluid is flushed out through that end. Next, the device is inserted into a second end 32 of the hose 3 to be repaired (after cutting the connector of this end to allow that insertion, with subsequent retermination to allow pumping), and then a polymer sealant is injected into the same end 32 of the hose 3, moving the device up to the area of the leak 4, using pressure exerted by the polymer sealant.

At this time, the fluid that was already inside the hose 3 has to be flushed out through the opening 4, where the leak continues until the repair body 1 completely covers the opening 4.

Since the first end 31 of the hose 3 is blocked, there is nowhere for any fluid to be flushed out, and the device will stop moving. At this point the pressure is increased upstream of the device, causing the polymer sealant to flush between the internal wall of the hose 3 and the external wall of the device, until it reaches the hole 4 in the hose 3 and flows more slowly.

The polymer sealant will then be subject to a large pressure variation when passing through the opening 4 in the hose 3, which will cause it to solidify, attaching the tubular repair body 1 to the inside of the hose 3, and repairing the existing leak through the opening 4.

At this moment, then, the first end 31 of the hose 3 must be released and the pressure upstream of the device must be increased so that the plug 21 cannot impede movement of the fusible element 2, causing the fusible element 2 to flush through the inside of the hose 3, thus completing repair of the leak.

The invention therefore provides a method for repairing the hose 3 of an umbilical, comprising the steps of:
blocking a first end 31 of a hose 3 of an umbilical;
inserting a device to repair umbilical hoses 3 into a second end 32 of the hose 3;
injecting a polymer sealant into the second end 32 of the hose 3;
using pressure to move the repair device upstream up to the area of the leak, until the repair body 1 completely covers the opening 4;
flushing the polymer sealant between the internal wall of the hose 3 and the external wall of the tubular repair body 1 until reaching the opening 4 in the hose 3;
solidifying the polymer sealant attaching the tubular repair body 1 to the inside of the hose 3;
releasing the first end 31 of the umbilical hose 3 to recover the fusible element 2; and
flushing out the fusible element 2 from inside of the hose 3.

In accordance with the method described in the preceding paragraph, the fusible element 2 can also be recovered from the first end 31 of the hose 3, as would be evident to an expert in the matter.

In order for the repair device to function completely, it is important that the repair body 1 be longer than the opening 4 in the hose 3, so that this element completely covers the opening 4 and still has some excess.

How much larger the repair body 1 should be can be defined on a case by case basis, so that this characteristic is not a limiting factor to the scope of protection of the invention.

Optionally, the fusible cap 21 comprises a flexible circular element whose diameter is smaller than the internal diameter of the hose 3. The characteristics of the material that will comprise this element will be defined on a case by case basis so that it supports the necessary pressure levels, as described above.

Optionally, the cylindrical body 22 is manufactured of high-density foam, entirely filling the interior of the tubular repair body 1.

Optionally, the tubular body and the umbilical hose 3 are manufactured out of polyamide. However, the best material for manufacturing this element may vary, and will be best defined on a case by case basis by an expert in the matter, wherein the pipe may be reinforced with a highly resistant material, such as Kevlar™.

Therefore, the invention provides a device and a method for repairing large leaks (such as tears) in umbilical hoses 3 using the same polymer sealants used in the current state of the art.

The notion is reinforced that such polymer sealants can only be efficiently used, currently, to repair small leaks in umbilical hoses (of up to 3 liters/minute at pressures on the order of 100 bar, typically represented by small holes), while the device now revealed can be used to repair large leaks.

Countless variations to the scope of protection of this application are allowed. Thus, the notion is reinforced that the present invention is not limited to the specific configurations/embodiments described above.

The invention claimed is:

1. A device for repairing a hose of an umbilical, the device comprising:
a tubular repair body; and
a fusible element removably coupled with the tubular repair body,
wherein the fusible element is tubular and adapted to obstruct passage of fluid through the inside of the tubular repair body,
wherein the tubular repair body comprises an external diameter that matches an internal diameter of the hose of the umbilical, and
wherein the fusible element is removably detached from the tubular repair body after an opening in the hose of the umbilical is repaired.

2. The device of claim 1, wherein the fusible element comprises a cylindrical body internal to the tubular repair body, and a circular fusible plug including a diameter that is larger than the diameter of the cylindrical body and the diameter of the circular fusible plug is smaller than the internal diameter of the hose of the umbilical.

3. The device of claim 2, wherein the cylindrical body of the fusible element is manufactured of high-density foam that entirely fills the interior of the tubular repair body.

4. The device of claim 1, wherein a length of the tubular repair body is larger than the opening of a leak in the hose.

5. The device of claim 1, wherein the tubular repair body and the hose of the umbilical comprise of a polyamide.

6. A method of repairing a hose of an umbilical, the method comprising:

blocking a first end of a hose of the umbilical;

inserting a repair device to repair the hose of the umbilical into a second end of the hose, the repair device including a tubular repair body and a fusible element removably coupled with the tubular repair body;

injecting a polymer sealant into a second end of the hose;

using pressure from the injection to move the repair device upstream to an area of a leak in the hose until the tubular repair body of the repair device completely covers an opening in the hose causing the leak;

flushing the polymer sealant between an internal wall of the hose and an external wall of the tubular repair body until the polymer sealant reaches the opening in the hose;

solidifying the polymer sealant attaching the tubular repair body inside the hose;

releasing the first end of the hose of the umbilical which causes the fusible element to detach from the tubular repair body; and flushing the fusible element from inside the tubular repair body located at the area of the leak in the hose.

\* \* \* \* \*